US011776222B2

(12) United States Patent
Stauber et al.

(10) Patent No.: US 11,776,222 B2
(45) Date of Patent: *Oct. 3, 2023

(54) METHOD FOR DETECTING OBJECTS AND LOCALIZING A MOBILE COMPUTING DEVICE WITHIN AN AUGMENTED REALITY EXPERIENCE

(71) Applicant: Roblox Corporation, San Mateo, CA (US)

(72) Inventors: Mark Stauber, Bronx, NY (US); Jaeyong Sung, Bronx, NY (US); Devin Haslam, Bronx, NY (US); Amichai Levy, Bronx, NY (US)

(73) Assignee: Roblox Corporation, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/555,925

(22) Filed: Dec. 20, 2021

(65) Prior Publication Data
US 2022/0114797 A1 Apr. 14, 2022

Related U.S. Application Data

(63) Continuation of application No. 17/102,340, filed on Nov. 23, 2020, now Pat. No. 11,238,668, which is a (Continued)

(51) Int. Cl.
G06T 19/00 (2011.01)
G06T 19/20 (2011.01)
(Continued)

(52) U.S. Cl.
CPC .......... *G06T 19/006* (2013.01); *G02B 27/017* (2013.01); *G06F 3/011* (2013.01);
(Continued)

(58) Field of Classification Search
None
See application file for complete search history.

(56) References Cited

U.S. PATENT DOCUMENTS

| 2012/0212405 | A1 | 8/2012 | Newhouse et al. |
| 2017/0256097 | A1 | 9/2017 | Finn et al. |
| (Continued) | | | |

FOREIGN PATENT DOCUMENTS

WO 2015/168675 11/2015

OTHER PUBLICATIONS

USPTO, Non-final Office Action for U.S. Appl. No. 17/102,340, filed Jun. 16, 2021, 10 pages.
(Continued)

*Primary Examiner* — Frank S Chen
(74) *Attorney, Agent, or Firm* — IP Spring

(57) ABSTRACT

A method includes: recording a series of frames; recording a set of motion data representing motion of the mobile device; detecting relative positions of a 3D constellation of objects based on the series of frames and the set of motion data; generating classifications of the 3D constellation of objects by calculating a classification of each object in a set of object classes; calculating a transform aligning the 3D constellation of objects with a 3D localization map; accessing a set of augmented reality assets defined by the 3D localization map; calculating a position of the mobile device relative to the 3D localization map based on the transform and the set of motion data; and rendering the set of augmented reality assets based on positions of the set of augmented reality assets in the 3D localization map and based on the position of the mobile device in the 3D localization map.

20 Claims, 5 Drawing Sheets

Related U.S. Application Data continuation of application No. 16/588,856, filed on Sep. 30, 2019, now Pat. No. 10,885,721.

(60) Provisional application No. 62/739,024, filed on Sep. 28, 2018.

(51) Int. Cl.
| | | |
|---|---|---|
| *G06F 3/01* | (2006.01) | |
| *G02B 27/01* | (2006.01) | |
| *G06V 20/20* | (2022.01) | |
| *G06V 10/75* | (2022.01) | |
| *G06V 20/64* | (2022.01) | |

(52) U.S. Cl.
CPC ............. *G06F 3/017* (2013.01); *G06T 19/20* (2013.01); *G06V 10/757* (2022.01); *G06V 20/20* (2022.01); *G06V 20/653* (2022.01); *G02B 2027/014* (2013.01)

(56) References Cited

U.S. PATENT DOCUMENTS

| | | |
|---|---|---|
| 2017/0297198 A1 | 10/2017 | Lawrence, III et al. |
| 2017/0323179 A1 | 11/2017 | Vallespi-Gonzalez |
| 2017/0323376 A1* | 11/2017 | Glaser ................. G06Q 20/203 |
| 2018/0268237 A1 | 9/2018 | Stanimirovic et al. |
| 2019/0020817 A1 | 1/2019 | Shan et al. |
| 2019/0197599 A1 | 6/2019 | Zia et al. |
| 2019/0317974 A1 | 10/2019 | Chamberlin et al. |

OTHER PUBLICATIONS

USPTO, International Search Report for International Patent Application No. PCT/US2019/053896, dated Dec. 20, 2019, 2 pages.
USPTO, Written Opinion for International Patent Application No. PCT/US2019/053896, dated Dec. 20, 2019, 5 pages.
USPTO, Notice of Allowance for U.S. Appl. No. 17/102,340, filed Oct. 1, 2021, 5 pages.
USPTO, Notice of Allowance for U.S. Appl. No. 16/588,856, filed Aug. 21, 2020, 8 pages.

\* cited by examiner

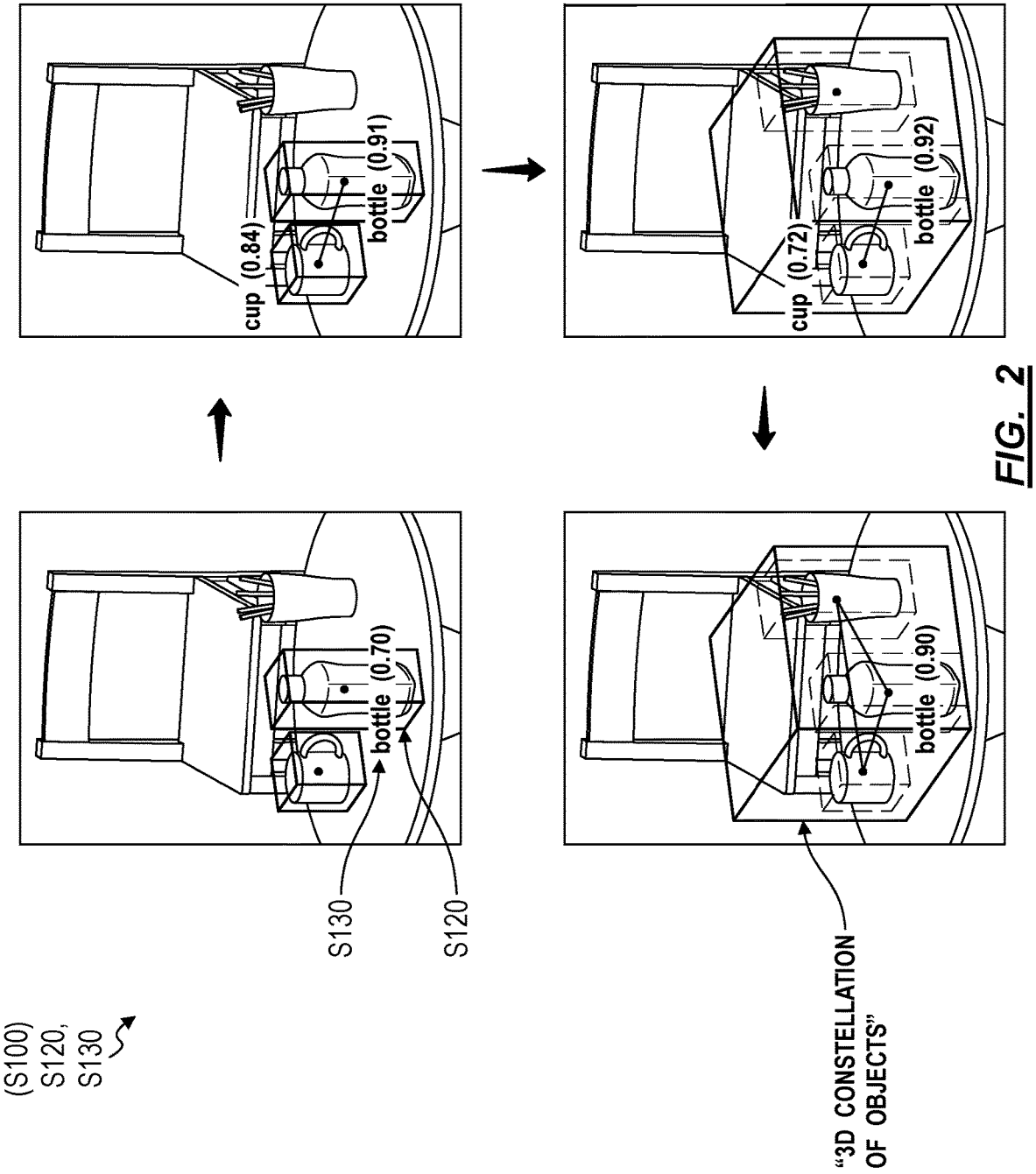

METHOD FOR DETECTING OBJECTS AND LOCALIZING A MOBILE COMPUTING DEVICE WITHIN AN AUGMENTED REALITY EXPERIENCE

CROSS-REFERENCE TO RELATED APPLICATIONS

This Application is a continuation application of U.S. patent application Ser. No. 17/102,340, filed on 23 Nov. 2020, which is a continuation application of U.S. patent application Ser. No. 16/588,856, filed on 30 Sep. 2019, which claims the benefit of U.S. Provisional Application No. 62/739,024, filed on 28 Sep. 2018, each of which is incorporated in its entirety by this reference.

TECHNICAL FIELD

This invention relates generally to the field of augmented reality and more specifically to a new and useful method for detecting objects and localizing a mobile device within an augmented reality experience in the field of augmented reality.

BRIEF DESCRIPTION OF THE FIGURES

FIG. 2 is a flowchart representation of one variation of the method;

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1A:
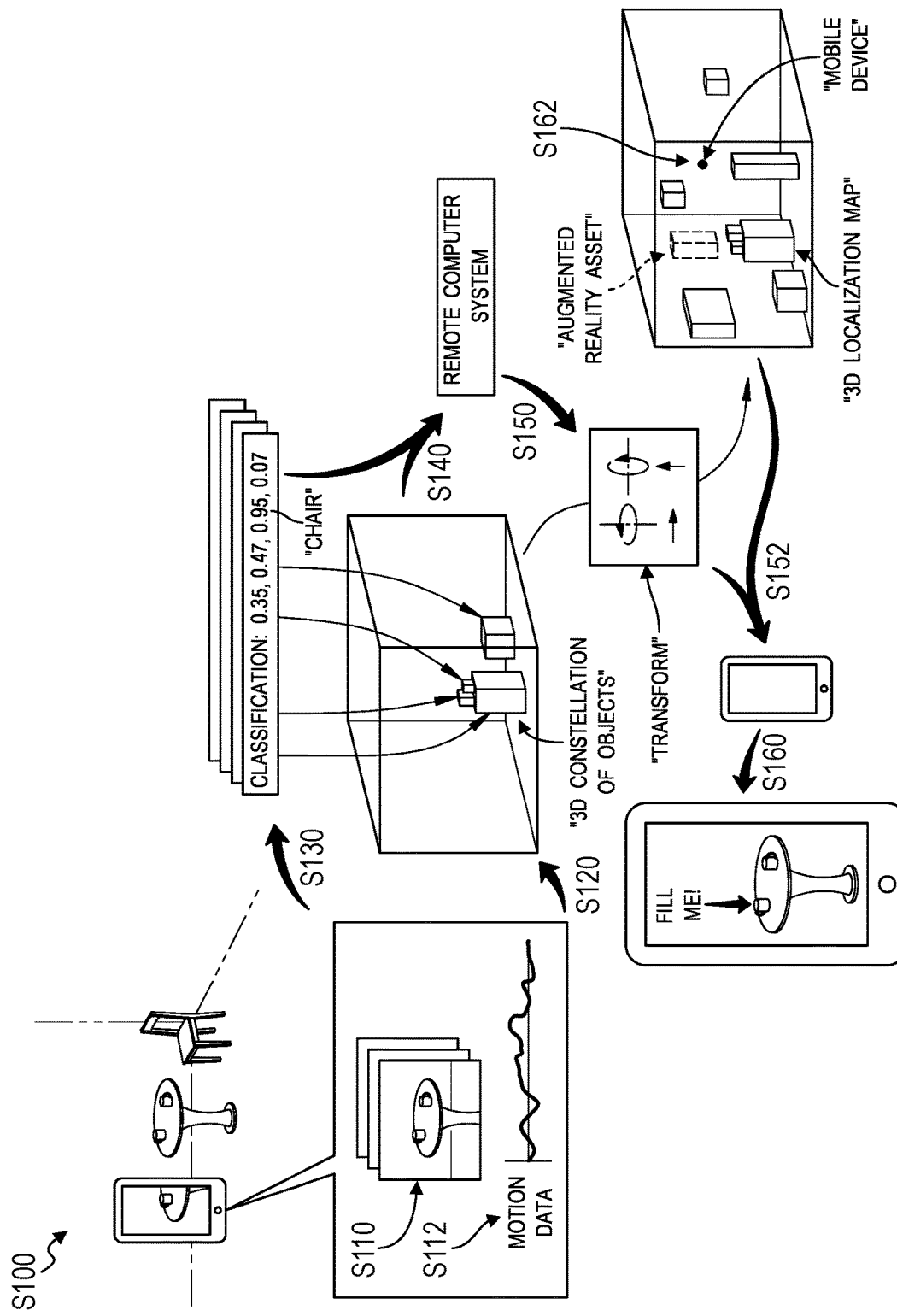
FIGS. 1A and 1B are a flowchart representation of a method.
Figure 1B:
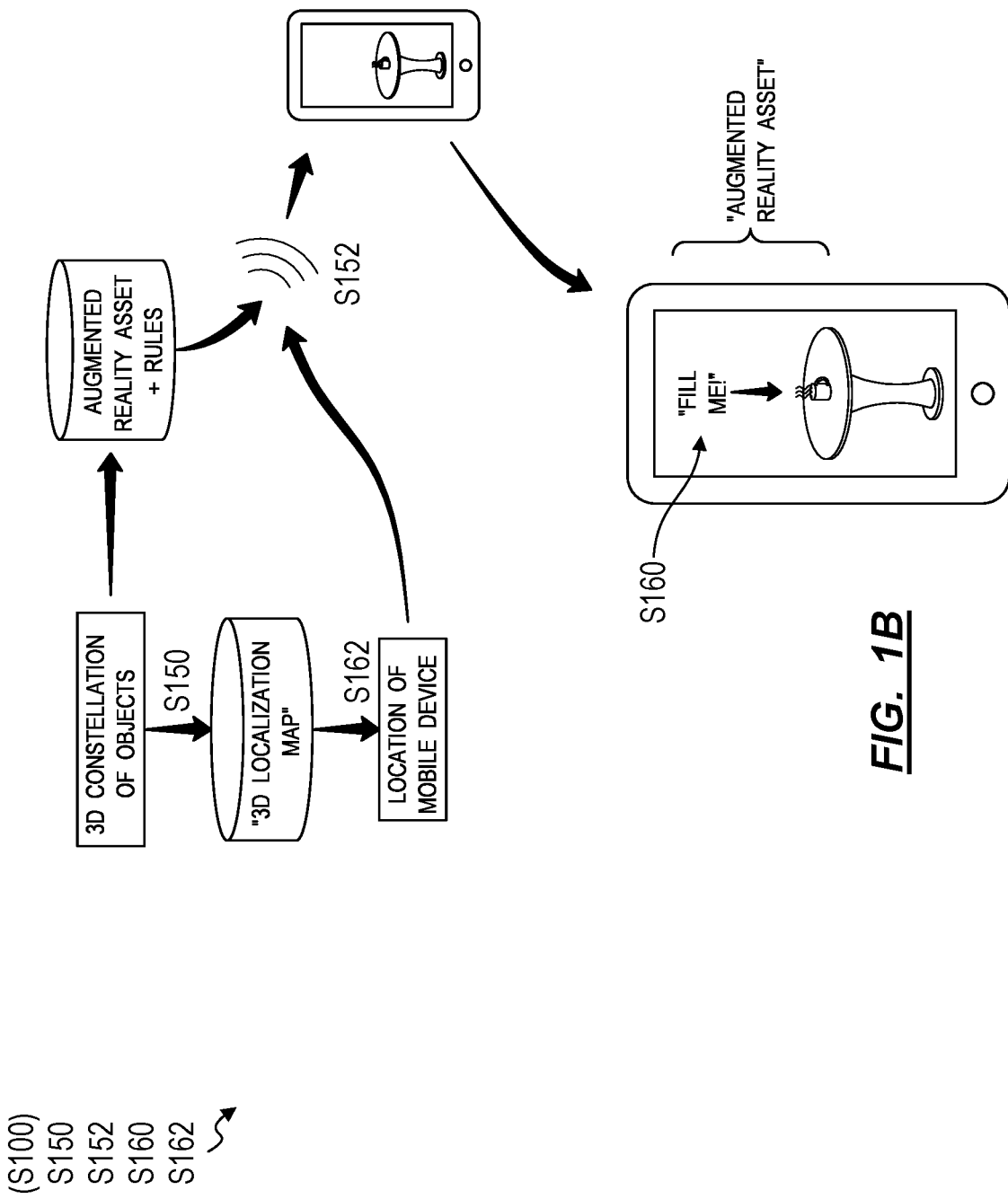

As shown in FIG. 1A, a method S100 for rendering augmented reality content includes, at a mobile device and during a recording period: recording a series of frames in Block S110; and recording motion data representing motion of the mobile device in Block S112. The method S100 also includes: detecting relative positions of a 3D constellation of objects based on the series of frames and the motion data in Block S120; generating a set of classification vectors of the 3D constellation of objects by calculating a classification vector for each object in the 3D constellation of objects, the classification vector representing a confidence score of the object for each object class in a set of object classes in Block S130; and returning the 3D constellation of objects and the set of classification vectors to a remote computer system in Block S140. The method S100 further includes, at the remote computer system: calculating a transform aligning the 3D constellation of objects with a 3D localization map defining a set of objects characterized by relative positions and classification vectors matching the relative positions and the set of classification vectors of the 3D constellation of objects in Block S150; and returning, to the mobile device, a set of augmented reality assets defined by the 3D localization map and the transform in Block S152. The method S100 also includes, at the mobile device, rendering the set of augmented reality assets onto a display based on positions of the set of augmented reality assets in the 3D localization map and based on the transform in Block S160.

As shown in FIG. 1A, one variation of the method S100 includes, at a mobile device and during a first recording period: recording a first series of frames in Block S110; and recording a first set of motion data representing motion of the mobile device in Block S112. This variation of the method S100 also includes, at the mobile device: detecting relative positions of a first 3D constellation of objects based on the first series of frames and the first set of motion data in Block S120; calculating a classification of each object in the first 3D constellation of objects based on the first series of frames in Block S130; and returning the first 3D constellation of objects and the classification of each object to a remote computer system in Block S140. The method S100 further includes, at the remote computer system: calculating a transform aligning the first 3D constellation of objects with a 3D localization map defining a set of objects characterized by relative positions and classifications matching the relative positions and the classifications of the first 3D constellation of objects in Block S150; and returning, to the mobile device, a set of augmented reality assets defined by the 3D localization map, and the transform in Block S152. This variation of the method S100 also includes, at the mobile device: calculating a position of the mobile device relative to the 3D localization map based on the transform in Block S162; and rendering the set of augmented reality assets onto a display based on positions of the set of augmented reality assets in the 3D localization map and based on the position of the mobile device in the 3D localization map in Block S160.

As shown in FIG. 1A, another variation of the method S100 includes, at a mobile device during a first recording period: recording a first series of frames in Block S110; and recording a first set of motion data representing motion of the mobile device in Block S112. This variation of the method S100 also includes: detecting relative positions of a 3D constellation of objects based on the first series of frames and the first set of motion data in Block S120; generating classifications of the 3D constellation of objects, for each object in the 3D constellation of objects, by calculating a classification of the object in a set of object classes in Block S130; calculating a transform aligning the 3D constellation of objects with a 3D localization map defining a set of objects characterized by relative positions and classifications matching the relative positions and the classifications of the 3D constellation of objects in Block S150; accessing a set of augmented reality assets defined by the 3D localization map and the transform in Block S164; calculating a position of the mobile device relative to the 3D localization map based on the transform and the first set of motion data in Block S162; and rendering the set of augmented reality assets onto a display based on positions of the set of augmented reality assets in the 3D localization map and based on the position of the mobile device in the 3D localization map in Block S160.

2. Applications

Generally, Blocks of the method S100 can be executed by a native application or web browser (hereinafter an "app")— executing on a mobile device—and by a remote computer system to localize the mobile device within a space, to detect objects near the mobile device, and to render augmented reality assets—aligned with corresponding objects detected nearby—on a viewfinder of the mobile device in (near) real-time.

In particular, the application can: implement computer vision, artificial intelligence, deep learning, or similar methods and techniques to detect and characterize objects in a video feed recorded by a 2D color camera on the mobile device; estimate 3D positions of these objects relative to the mobile device in individual 2D frames based on concurrent 2D frames and motion data collected by the mobile device; compile 3D position estimates of objects derived from a small set of contiguous 2D frames into higher-resolution, lower-noise composite 3D positions of these objects relative to the camera; and return characterizations of these objects and their composite 3D positions, as a "3D constellation of objects" to a remote computer system, such as via a wireless computer network. The remote computer system can then: compare characterizations of these objects and their composite 3D positions to a predefined 3D localization map to determine the position and orientation of the mobile device relative to a virtual origin defined in the 3D localization map; access augmented reality assets associated with a space containing this location; and return the location of the mobile device relative to the virtual origin and augmented reality assets—also defined relative to the virtual origin—to the mobile device in near real-time. The application can then project an augmented reality asset onto an associated object detected in the last 2D frame recorded by the camera based on the position and orientation of the camera relative to the virtual origin, the position and orientation of the augmented reality asset defined relative to the virtual origin, and the position and orientation of the object relative to the mobile device. Similarly, the application can project augmented reality assets onto an associated mutable object detected in the last 2D frame recorded by the camera based on the position and orientation of the object relative to the mobile device. The application can then render this augmented 2D frame on a display of the mobile device (hereinafter a "viewfinder") substantially in real-time.

Therefore, the application improves upon existing localization technology by localizing mobile devices relative to a virtual origin based on high-level, semantic characterization of objects as opposed to relying solely on low-level, computationally heavy point-cloud-based localization (e.g., via point cloud comparison, surface detection etc.). As a result, the application can localize the mobile device in 3D space in a similar manner to a human—by identifying relative positions of identifiable objects in a space and comparing these 3D constellations of objects to know spaces. As a result, the application is less sensitive to changes in a 3D environment or the ability of the mobile device to detect the 3D environment such as slight changes in the positioning of objects or obstructing objects, lighting conditions, or any other transient effect that may change the 3D environment or the ability of the mobile device to detect the 3D environment.

Therefore, the app: can execute on a mobile device; can leverage a local object detection model—defining a relatively small footprint—to rapidly detect and characterize objects in 2D frames recorded by a camera in the mobile device; and can combine and filter 3D locations of objects estimated from short consecutive sets of these 2D frames to increase accuracy of calculated locations of these objects while limiting latency of these calculations; and then return these data to a remote computer system for processing. For example, the mobile device can leverage a local object detection model trained to output an "object signature" containing a set of scores for likeness of an object to each object class in a predefined, ordered set of object classes—rather than identify an object as a particular species of many possible species in a particular object class in many possible object classes. The remote computer system can then leverage more powerful remote processing and a relatively large (or "heavy") 3D localization map to rapidly determine the position and orientation of the mobile device in real space based on object location and characterization data received from the mobile device. The remote computer system can also aggregate augmented reality assets associated with immutable and mutable objects in a space containing the location of the mobile device and return these augmented reality assets and the location of the mobile device to the mobile device. The application can then leverage these augmented reality assets and the location of the mobile device to render augmented reality content on the mobile device substantially in real-time.

3. Pre-Mapping

Figure 3:
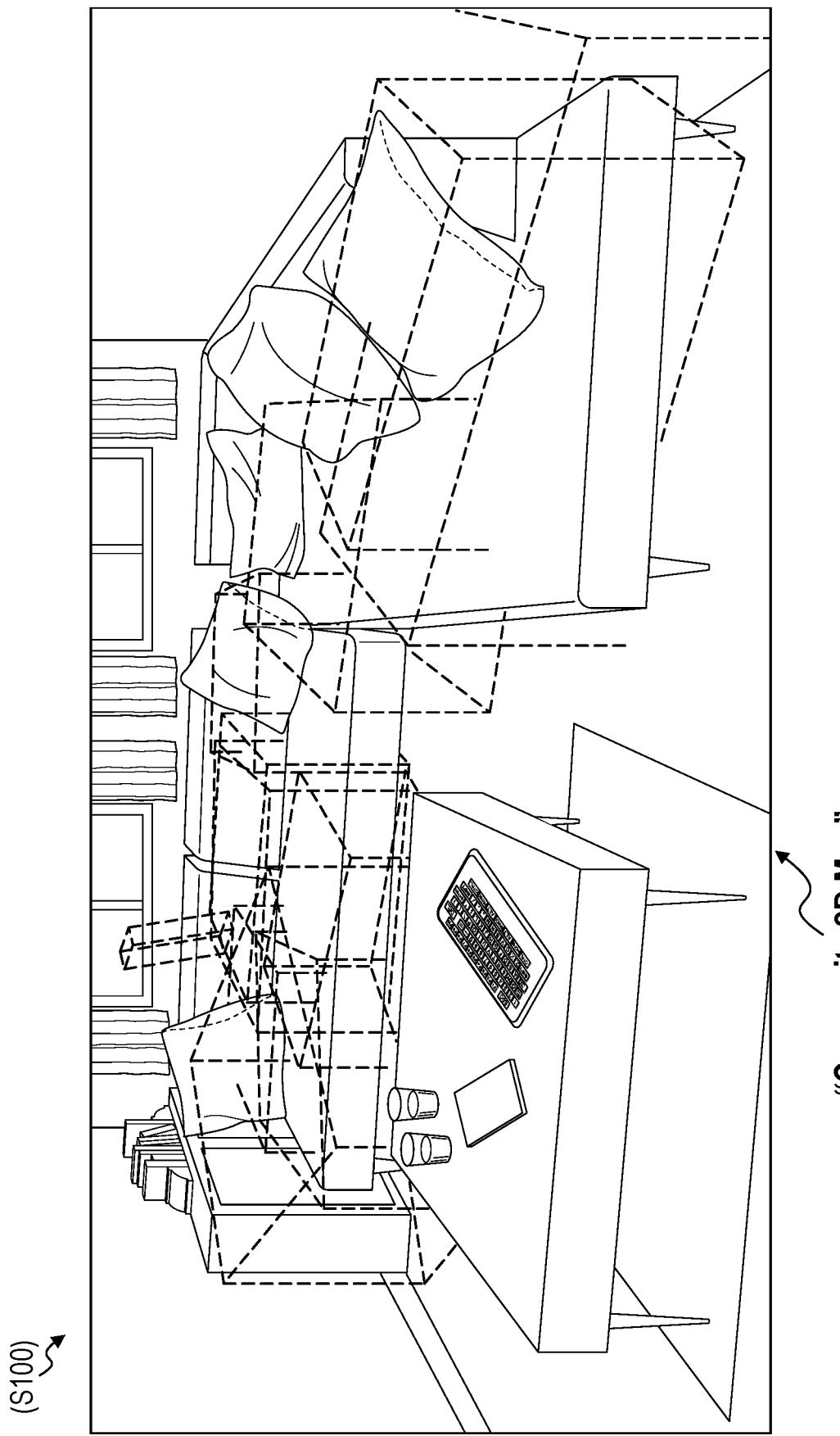
FIG. 3 is a flowchart representation of one variation of the method.

In one variation, as shown in FIG. 3, the remote computer system interfaces with an operator through an operator app executing on a mapping device carried by the operator to construct an initial 3D localization map of a new space and to populate this 3D localization map with (or link objects represented in the 3D localization map to) augmented reality assets.

In one implementation, an operator walks around a new space with a mobile device executing an instance of the operator app, which captures: a sequence of 2D frames through a camera integrated into the mobile device; motion device data synchronized to these 2D frames; and a geospatial location of the mobile device during this pre-mapping period. The mobile device can then implement methods and techniques described below to detect objects in these 2D frames, to calculate their 3D locations, to calculate their object signatures, and to then return these data to the remote computer system. The remote computer system can then construct a 3D localization map representing this space, such as including locations, types, sizes, and/or signatures (i.e. classification vectors), etc. of objects detected throughout this space over this pre-mapping period and defined within the 3D localization map relative to a common virtual origin, such as static or immutable objects only. The remote computer system can also label each object representation in the 3D localization map as either static (e.g., possibly immutable) or moving (e.g., mutable) based on whether the remote computer system or the operator app determined that the object was moving relative to the earth during this pre-mapping period. Alternatively, the remote computer system can label each object represented in the 3D localization map based on a probability of the object's motion, such as based on prior frames in which an object of the same or similar signature was detected and whether this similar object was determined to have moved between these prior frames; and/or with a speed, velocity, and/or acceleration of the object. The remote computer system can further tag the 3D localization map with the geospatial location of the mobile device during this pre-mapping period.

More specifically, the operating app can, at a mapping device, during a recording period: record a series of 2D frames capturing an area of interest; and record a set of motion data representing motion of the mapping device; and return the series of 2D frames and the set of motion data to the remote computer system. Once the remote computer system receives the series of 2D frames and the set of motion data, the remote computer system can: identify a set of objects based on the series of 2D frames and the second set of motion data. The remote computer system can then, for each object in the set of objects: calculate a location of the object relative to a virtual origin; and calculate a classification of the object. The remote computer system can then generate a 3D localization map based on the location of each object in the set of objects relative to the virtual origin and the classification of each object in the set of objects. Alternatively, the operator application can execute the above-described steps of the remote computer system at the mapping device.

Additionally, the operator app and/or the remote computer system can generate a 3D point cloud and/or surface map based on the series of frames and/or the motion data recorded at the mapping device and combine this 3D point cloud map with the 3D localization map to generate a composite 3D map of an area of interest, which includes detected objects and their associated locations and signatures in addition to a point cloud, surface based, or visual map of the area of interest. By generating a composite 3D map, the operator app can identify additional visual features in the area of interest and provide more features onto which the operator app can map augmented reality assets.

More specifically, the operator app can (e.g., at the remote computer system): generate a dense set of points representing distances from the camera of the mapping device to surfaces of an area of interest based on the set of frames and the set of motion data; generate a dense 3D point cloud reconstruction of the area of interest based on the dense set of points; and overlay the dense 3D point cloud reconstruction over the 3D localization map to generate a composite 3D map.

However, due to the longer processing time of generating the dense 3D point cloud reconstruction of the area of interest, the operator app can generate a sparse 3D reconstruction of the area of interest based on the set of frames and the motion data recorded by the mapping device. The mapping device can, therefore, display the sparse 3D reconstruction to a user of the operator app such that the user may ascertain whether she has successfully captured the entirety of the area of interest. Therefore, the operator app can generate a 3D reconstruction of the space that can be quickly visually represented on the display of the mapping device in order to improve a user experience of the operator app during capture of an area of interest. Therefore, a user of the operator app may view the sparse 3D reconstruction of the area of interest and identify an obstruction (or any other problem such as blurring) that prevented successful capture of the area of interest. Upon identifying that the capture of the area of interest was unsuccessful, the user may then choose to recapture the area of interest via the operator app.

More specifically, the operator app can: generate a sparse set of points representing distances from a camera of the mapping device to surfaces of the area of interest based on the second set of frames and the second set of motion data; generate a sparse 3D point cloud reconstruction of the area of interest based on the sparse set of points; and, at the mapping device, render the sparse point cloud 3D reconstruction of the area of interest.

Furthermore, the remote computer system can then interface with the operator through the operator portal: to upload augmented reality assets (e.g., static or animated augmented reality overlays, audio snippets); to link specific unique objects, object classes, or object species (described below), etc. detected in these 2D frames with these augmented reality assets; and to define rules for presenting these augmented reality assets when these objects or like objects are detected by an instance of the application executing on a mobile device occupying this same space at another time in the future. Finally, the remote computer system can store the 3D localization map, the augmented reality assets, and rules linking these augmented reality assets to unique objects, object classes, and object species in a remote database before enabling this augmented reality experience for other mobile devices in this space.

However, the remote computer system can interface with the operator portal, the mobile device, and the operator in any other way to initialize a new augmented reality experience for a new space.

4. Object Detection and Localization Summary

Generally, the application executes Blocks of the method S100 in real-time to detect, track, and characterize objects in 2D frames—recorded by a single 2D color camera in the mobile device—in (near) real-time. The application can then, in Block S120, assemble these detected objects, and related characteristics and classifications of these objects into a 3D constellation of objects that can be compared to a more dense 3D localization map in order to localize a mobile device relative to a known area of interest and to display augmented reality assets placed in this area of interest.

More specifically, the application can: access a stream of 2D frames recorded by a camera integrated into the mobile device; implement visual-inertial odometry, structure from motion, deep learning, or similar techniques to construct a 3D manifold of surfaces in the field of view of the camera based on features detected in this stream of 2D frames and based on motion of the mobile device over time; implement artificial intelligence, deep learning, or other computer vision techniques to detect and track an object across these 2D frames; implement ray casting techniques to estimate distances from the camera to the object projected from a current 2D frame projected onto the 3D manifold; calculate a 3D position (i.e., horizontal distance, vertical distance, and depth) of the object relative to the camera at the time this 2D frame was recorded based on this ray; and repeat this process for each subsequent 2D frame recorded by the camera.

In this example, the application can then combine 3D positions of this object derived from a set of (e.g., three) consecutive 2D frames in this video feed into one composite position of the object relative to the camera based on tracked motion of the mobile device over the period of time that this set of 2D frames was recorded, such as in the form of a composite 3D bounding box defined relative to the camera and predicted to fully and tightly encompass the object.

In particular, by combining 3D positions of one object derived from multiple consecutive frames, the application can reject noise and increase accuracy of the calculated 3D position of the object relative to the camera over this small set of consecutive 2D frames. However, by limiting the number of 2D frames in this set, the application can finalize its calculation of the next position of the object relative to the camera with limited latency (e.g., at a rate of 8 Hz, or 124 milliseconds between consecutive object location calculations, for sets of three consecutive frames recorded by the camera operating at a frame rate of 24 Hz).

Additionally, upon calculating a 3D bounding box representing the position of each object relative to the mobile device (or relative to a local virtual origin defined relative to the mobile device and defined by the mobile device), the application can then execute a classification model to generate a classification vector (or signature) for each detected object, thereby uniquely identifying the object to the application.

The application is described below as executing these Blocks of the method S100 to merge object location estimates from discrete, non-overlapping sets of consecutive 2D frames. However, the application can implement similar methods and techniques for any other number of overlapping or non-overlapping sets of consecutive 2D frames recorded by the camera.

4.1 2D Object Detection and Tracking

As shown in FIG. 1A, while the application is open and active on the mobile device, the application can access a stream of 2D frames recorded by a 2D camera in the mobile device in Block S110. The application can then: implement 2D object detection techniques to detect objects in each 2D frame (e.g., via a convolution neural network executed on each 2D frame); and implement object tracking techniques to link like objects detected across this stream of 2D frames and to track objects throughout this series of 2D frames.

The application can also leverage object trajectory information derived from preceding frames to predict locations of this object in frames in the current set and then link objects detected in 2D frames in the preceding and current sets based on 2D spatial proximity to locations predicted by this object trajectory at corresponding frame times. Thus, the application can detect objects across multiple 2D frames in order to accumulate image data about each individual object in order to better characterize and locate each object relative to the mobile device (and/or a local virtual origin defined by the mobile device).

4.2 Mobile Device Motion

As shown in FIG. 1A, while accessing and processing 2D frames recorded by the camera, the application can also track 3D motion of the mobile device relative to the earth in Block S112. For example, the application can record accelerations and angular velocities output by accelerometer and gyroscope sensors (e.g., a six-degree-of-freedom IMU), respectively, integrated into the mobile device, and store these timestamped motion data. The application can also implement dead reckoning techniques to derive translational and rotational changes in the position and orientation of the mobile device between recordation of consecutive 2D frames. In one implementation, the application (e.g., at the beginning of a recording period for a set of 2D frames) can define a local virtual origin relative to the mobile device. Therefore, as the mobile device records 2D frames and motion data and detects objects in the area of interest, the application can track the current position of the mobile device in the area of interest (via the aforementioned inertial tracking and dead-reckoning techniques) and define locations of objects detected in the area of interest (e.g., and/or a 3D constellation of these objects) relative to the local virtual origin.

4.3 Single-Frame Object Volumetric Approximation

As shown in FIGS. 1A, 2, and 3, the application can: implement visual-inertial odometry, structure from motion, or similar techniques to derive depth information from a series of 2D frames recorded over a period of time and based on motion information (e.g., changes in position and orientation) of the mobile device tracked over this period of time; and then construct a 3D manifold or other virtual 3D representation of surfaces in the field of view of the 2D camera. (Alternatively, the application can access similar "loose" 3D perception information generated and output by an operating system executing on the mobile device.)

Upon detecting an object in a first 2D frame—in the set of consecutive frames recorded by the camera—the application can: calculate a 2D bounding box around this object in the first 2D frame; and project the 2D bounding box and the object depicted in two dimensions in the first 2D frame onto the 3D manifold generated from preceding 2D frames and concurrent motion of the mobile device and defined relative to the camera. The application can then implement ray casting techniques to: virtually project a first ray from the position of the camera into the 2D bounding box projected on the 3D manifold and determine whether the first ray intersects the projection of the object onto the 3D manifold. If so, the application can: calculate a distance from the position of the camera to a point on the 3D manifold at which the first ray intersects the projection of the object; and store the lateral, longitudinal, and depth positions of this intersection relative to the camera. The application can repeat this process for many rays cast from the location of the camera into the 2D bounding box projected onto the 3D manifold.

The application can then populate a 3D graph with a cluster of 3D points—defining lateral, longitudinal, and depth locations relative to the camera—wherein each point represents an intersection of a ray, virtually cast from the camera, on the object detected in the 2D frame and projected onto the 3D manifold. The application can subsequently calculate a 3D bounding box that encompasses this cluster of 3D points in the 3D graph and define this 3D bounding box relative to the camera.

The application can repeat this process for this same object detected in the remaining (e.g., subsequent two) 2D frames in the current set in order to generate two additional bounding boxes defined relative to the camera and encompassing a cluster of 3D points representing this object.

4.4 Composite 3D Bounding Box

As shown in FIGS. 1A and 2, the application can then compile these lower-accuracy 3D bounding boxes calculated for the object from individual 2D frames—in this designated set of consecutive 2D frames—into a higher-accuracy 3D location at the object and/or into a higher-accuracy 3D bounding box tightly containing this object based on absolute motion of the mobile device between recordation of these 2D frames.

For example, the application can: access a first 2D frame recorded at a first time; detect and calculate a first 3D bounding box around a first object in the first 2D frame; access a second 2D frame recorded at a second time; detect and calculate a second 3D bounding box around the first object in the second 2D frame; access a third 2D frame recorded at a third time; and detect and calculate a third 3D bounding box around the first object in the third 2D frame. The application can also: calculate a first change in position of the mobile device from a first timestamp of the first 2D frame and a second timestamp of the second 2D frame; and calculate a second change in position of the mobile device from the second timestamp to a third timestamp of the third 2D frame. The application can then: locate the first 3D bounding box within the 3D graph with an origin of the 3D graph located at or relative to the location and orientation of the mobile device at the first timestamp; locate the second 3D bounding box within the 3D graph based on the first change in position of the mobile device; and locate the third 3D bounding box within the 3D graph based on a sum of the first change and the second change in position of the mobile device. Finally, the application can calculate a volumetric average of these bounding boxes, a volumetric intersection of these bounding boxes, or any other volumetric combination of these bounding boxes within the 3D graph to calculate a composite bounding box characterized by greater accuracy and a greater likelihood of tightly containing the object if projected into the 3D graph.

The application can therefore combine frame-specific 3D bounding boxes around the object-derived from 2D frames from the current set of 2D frames—into one composite 3D bounding box.

In this implementation, the application can also: calculate a preceding change in position of the mobile device from the first timestamp of the first 2D frame in this set and a timestamp associated with a preceding 3D composite bounding box; and locate a preceding composite 3D bounding box calculated from the preceding set of 2D frames within the 3D graph based on the preceding change in position of the mobile device. The application can then calculate the composite 3D bounding box based on the first, second, and third bounding boxes and the preceding composite 3D bounding box, such as with the latter assigned a lower weight.

Alternatively, the application can implement similar methods and techniques: to locate 3D point clouds associated with a particular object-derived from individual frames in the current set—into the 3D graph based on estimated changes in position and orientation of the camera over a period of time that the corresponding 2D frames were recorded; and to then calculate and store a 3D composite bounding box that encompasses this aggregated set of 3D points.

In Block S120, the application can generate 3D graphs for each object detected in a set of 2D frames and perform the above steps for each detected object to generate a 3D constellation of objects around the mobile device. More specifically, for each object in a 3D constellation of objects, the application can: for each frame in a subset of the series of frames: detect the object in the frame and generate a set of points representing estimated distances from a camera of the mobile device to surfaces on the object. The application can then: compile the set of points into a cluster of points (i.e. a 3D graph) based on the motion data; and calculate a relative position of the object relative to the local virtual origin based on the cluster of points. Additionally or alternatively, the application can also calculate a bounding box or representation of the position and/or orientation of the object relative to the mobile device and/or a local virtual origin defined by the mobile device.

4.5 Location Confidence Score

As the application executes the foregoing processes to estimate the location of the object—such as in the form of a single 3D point contained by the object or in the form of a bounding box around the object—in subsequent sets of consecutive frames, the application can also calculate confidence scores for the detected location of the object.

In one implementation, the application initially outputs a low confidence for the presence and location of the object when first detected in a 2D frame. However, as the mobile device records additional 2D frames and as the application detects and tracks this object across these next 2D frames, and thus amasses data specific for this object, the application can then estimate a trajectory of the object in real space. For example, the application can: calculate a nominal path of the object—relative to the camera in the mobile device—from centroids of 3D composite bounding boxes calculated for the object over a series of sets of consecutive 2D frames; implement dead reckoning techniques to transform acceleration and angular velocity data collected by sensors in the mobile device during recordation of these 2D frames into a path of the camera over this period of time; subtract the path of the camera from the nominal path of the object to calculate an absolute path of the object over this period of time; and then extrapolate an absolute trajectory of the object from this absolute path. (The application can additionally or alternatively implement visual odometry or other computer vision techniques to estimate the trajectory of the object.)

In the foregoing implementation, based on the absolute trajectory of the object and the change in position and orientation of the camera from the current frame to a next frame (or next set of 2D frames), the application can extrapolate a 2D and/or 3D position of the object at the reference time of a next set of consecutive 2D frames recorded by the camera. Upon detecting the object and calculating its 2D or 3D location in this next set of 2D frames, the remote computer system can calculate a difference (e.g., a 2D or 3D distance) between the extrapolated and calculated 2D and/or 3D locations of the object at the current time. The application can then calculate a location confidence score for the calculated location of the object at this time as a function of (e.g., proportional to) this difference.

The application can additionally or alternatively calculate a location confidence score for the composite 3D location calculated from a current set of consecutive 2D frames as a function of proportions of 2D frame-specific bounding boxes—generated from individual frames in this set of 2D frames—that overlap.

Once the application calculates a location confidence score for presence and location of the object that exceeds a threshold score (e.g., 40%), the application can: project the 3D bounding box around the object and/or locate an augmented reality asset (e.g., text, an icon, an animation) over the object depicted in the next 2D frame recorded by the camera; and then render this augmented 2D frame on a display of the mobile device in substantially real-time. For example, the application can thus selectively render an augmented reality asset on or near an object only once the application can calculate a location confidence score exceeding a threshold score in order to limit presentation of augmented reality content on or adjacent false-positive objects detected in these 2D frames.

However, the application can calculate and update the location confidence score for the object in any other way.

4.6 Object Characteristics

The application can also classify any detected object in the 3D constellation of objects as either static (e.g., "immutable") or dynamic (e.g., mobile, "mutable") based on the absolute path of the object detected during the recording period of the application. For example, while the application calculates a "null" path for the object, the application can label the object as static or immutable. While continuing to track this object over a subsequent series of 2D frames, the application can label the object as dynamic or mutable once the application determines that the absolute path of the object is no longer null, update preceding labels for the object to reflect the object as dynamic or mutable, and preserve this dynamic or mutable label for the object into the future (and/or for the general object classification or category label associated with this object, as described below).

Generally, the application can identify and record other characteristics of the object, such as the number of detected surfaces of the object, the orientation of the object, the dimensions of the 3D bounding box for the object, calculated volume of the object, visual patterns present on a surface of the object, or any other characteristics or feature of the object.

The application can store additional characteristics in association with any object in the 3D constellation of objects, such as: characteristics of surfaces that define the object (e.g., the number of such surfaces); the structure of the object (e.g., represented as a 3D point cloud) or any other representation of this structure such as the total volume of the object; the orientation of the object; the dimensions of a 3D bounding box of the object; text, symbols, or visual patterns detected on the object; and/or colors present on the object; etc.

In one implementation, the application can: detect a relative position of a planar surface as an object in the 3D constellation of objects and store, in association with this planar surface, a distinct 2D pattern (e.g., stored as an image). Therefore, the application can utilize the distinct 2D pattern to aid in precisely localizing the mobile device relative to a 3D localization map (e.g., by comparing the 2D pattern associated with the object to a 2D pattern associated with an object in the 3D localization map).

In another implementation, upon classifying an object in the 3D constellation of objects, the application can detect the orientation (e.g., pitch, roll, and yaw) of an object in addition to its position relative to the mobile device or a local virtual origin defined by the mobile device. For example, upon classifying an object as a chair, the system can identify the orientation of the chair based on features of the chair such as the planar surfaces of the seat and the seatback. The application can detect the orientation of any object for which an orientation can be consistently defined.

4.7 Object Classifier and Object Scores

As shown in FIG. 1A, the application can also implement an object classification model—such as in the form of an artificial intelligence or deep learning model—configured to characterize the object based on likeness to one or more predefined object classes in Block S130.

In one implementation, the application executes a deep learning classifier trained to output a likeness score of an object for each object class in a prepopulated set of (e.g., 90) unique object classes. For example, the application can pass a region of the current 2D frame containing a detected object into the deep learning classifier, and the deep learning classifier can return an "object signature" (i.e. a classification vector) including an array of scores ordered according to a predefined sequence of class types, wherein each value in the object signature represents a degree (or a "confidence score") for a likeness between the object and a corresponding object class in this prepopulated set of object classes. In this example, an object signature for the object can thus include: a highest score that corresponds to a primary object class (e.g., one of a cup, a wall, a human, a chair, a table, a shoe, a hat, food, a plant, etc.) most likely to include the object; and a combination of lower scores that correspond to secondary object classes and that, in combination, suggest a species or a uniqueness of the object.

More specifically, for each object in the 3D constellation of objects and for each object class in a set of object classes, the application can: calculate a confidence score in the classification vector based on an object classification model and the series of frames, the confidence score representing likeness of the object to the object class. Therefore, the application can generate an object signature in the form of an array of scores (e.g., contained in a vector). However, the application can generate an object signature in any other format.

Thus, the application semantically identifies features in an area of interest by identifying "objects" based on the set of 2D frames and motion data. However, the application does not need to correctly identify an object in order to utilize the object in a 3D constellation of objects for the purposes of localization assuming the deep learning classifier consistently identifies classification vectors for objects in the area of interest. For this reason, an object in the 3D constellation of objects is not limited to an object from the set of object classes or what a human would identify as an object at all. For example, the application can detect a sculpture of a turtle and calculate a classification vector that indicates that the turtle sculpture is primarily classified as a hat since turtle sculptures may not be included in the set of object classes. However, because the application can execute the same deep learning classifier to generate the 3D localization map and the 3D constellation of objects, the application will have identified the turtle sculpture as a hat (with an accompanying classification vector or object signature) in the 3D localization map and therefore the application, upon detecting, the turtle again in a 3D constellation of objects can match a newly generated classification vector for the turtle sculpture to the existing classification vector of the turtle sculpture in the 3D localization map. In another example, the application may even misidentify a 2D picture or pattern as an object. Although these 2D pictures or patterns may not be considered "objects" according to human perceptions and definitions, the application can still consistently identify them as objects; generate a classification vector for these 2D pictures or patterns; and relocalize a mobile device based on a 3D constellation of objects including these objects that are, in reality, 2D pictures or patterns.

In one implementation, the application can define an input vector for the deep learning classifier. The application can generate an input vector for each object in the 3D classification of objects. The input vector can include any of the aforementioned object characteristics detected in association with the object along with any relevant data recorded in association with the object—such as regions of 2D frames depicting the object, a 3D graph depicting the object, etc.

In another implementation, the application can utilize geolocation filtering to narrow the possible classifications of objects in an area. For example, the mobile device can detect its geolocation (e.g., via GPS or another global navigation system) and compare this geolocation to a geotagged 3D localization map. The application can then identify the classifications of objects represented in the 3D localization map and constrain the object classification model to only those objects represented in the 3D localization map corresponding to the mobile device's geolocation.

In yet another implementation, the application can execute a generalized object classification model and a set of class-specific object classification models for each object class evaluated by the generalized object classification model. For example, the application can classify an object as a chair with a high level of confidence and then evaluate a chair-specific model to classify the chair as a specific type of chair.

4.8 Object Confidence Score

As shown in FIG. 2, the application can further calculate an object confidence score proportional to consistency (e.g., as an inverse function of variance) or inversely proportional to variance of object class scores calculated for an object over a sequence of 2D frames (e.g., in a sequence of classification vectors corresponding to the sequence of 2D frames). For example, the application can: increase an object confidence score for an object following each consecutive 2D frame for which the application consistently identifies the object to be of one particular object class; and decrease the object confidence score for the object following each consecutive 2D frame for which the application determines that the primary object class of the object has changed.

In another example, in response to recording a 2D frame, the application can calculate scores for correlation of each predefined object class to the object detected in this 2D frame. For each subsequent 2D frame (or set of consecutive 2D frames), the application can: calculate the variance in scores for each object class calculated for this object over these 2D frames; normalize this variance by dividing by a number of these consecutive 2D frames; and adjust the object confidence score for the object as an inverse function of normalized variances for these object classes over these number of 2D frames.

In one implementation, the application can weight any classification similarity measure calculated by the application based on the object confidence score of each object in the constellation of objects. For example, the application can reduce the weight of objects identified with low confidence score when calculating the similarity measure.

However, the application can calculate and update the object confidence score for the object in any other way.

4.9 Other Objects and the 3D Constellation of Objects

The application can then label the 3D bounding box for the object in the 3D graph with a unique object identifier (or "ID"), the object signature, the location confidence score, and/or the object confidence score calculated for the object based on data extracted from the current set of 2D frames (e.g., the current set of three consecutive 2D frames). (As the application repeats the foregoing process upon receipt of the next set of 2D frames recorded by the camera and tracks this object over this set of 2D frames, the application can label the next 3D bounding box for this object with the same unique object ID, an object signature containing new scores calculated for the same ordered set of object classes, a new location confidence score, etc.) The application can implement this same process for other objects detected in the same set of 2D frames, such as in series or in parallel.

The application can then: initialize a 3D constellation of objects for the current set of 2D frames; timestamp this 3D constellation of objects, such as with a time that the center 2D frame or the last 2D frame in the current set was recorded; geotag the 3D constellation of objects with a GPS location of the mobile device at or near the time of the timestamp; and populate the 3D constellation of objects with an individual 3D point at the centroid of a 3D bounding box containing an object—such as relative to the camera or to the mobile device more generally—for each object in a group of objects detected in this current set of 2D frames. Additionally or alternatively, for each object in the group of objects detected in this current set of 2D frames, the application can populate the 3D constellation of objects with 3D bounding boxes containing each object in this group of objects detected in the current set of 2D frames.

The application can also transfer unique object IDs, object signatures, outputs of a neural network, location confidence scores, object confidence scores, locations or addresses of points representing discrete objects, etc. from the 3D graph to corresponding 3D points and/or to corresponding 3D bounding boxes in the 3D constellation of objects before transmitting the 3D constellation of objects to the remote computer system in (near) real-time via a wireless network.

The application can repeat this process over time to generate one 3D constellation of objects near the mobile device per set of consecutive 2D frames. For example, for the camera that records 2D frames at a frame rate of 24 Hz, the application can: detect objects in sets of three consecutive 2D frames recorded by the camera; calculate 3D locations and object signatures of these objects in each set of three consecutive 2D frames; compile these derived object data and corresponding unique object identifiers into one 3D constellation of objects of detected objects per set of three consecutive 2D frames; and return this 3D constellation of objects to the remote computer system at a rate of 8 Hz in Block S140 (e.g., via a local network, the internet or any other means).

In one implementation, the system can detect the 3D constellation of objects relative to a local virtual origin defined by the mobile device. For example, the mobile device can generate a local virtual origin upon initiating execution of the application. The mobile device can then track its position relative to the local virtual origin and therefore the position of the 3D constellation of objects relative to the local virtual origin. Therefore, upon comparing the 3D constellation of objects to a 3D localization map, the application can calculate a transform relating the local virtual origin to a global virtual origin of the 3D localization map. More specifically, the application can: detect positions of the 3D constellation of objects relative to a local virtual origin based on the series of frames and the motion data; calculate the transform aligning the local virtual origin with a global virtual origin of the 3D localization map; and calculate the position of the mobile device relative to the global virtual origin of the 3D localization map.

5. Unique Object Detection

The application and/or the remote computer system can leverage the object signature of an object detected in a 2D frame to distinguish the object from other objects detected in this 2D frame or represented in a 3D constellation of objects and/or to inform selection and then rendering of an augmented reality asset linked to the object in a 2D frame.

In one implementation, the application detects a first and a second object in a first 2D frame, implements the object classifier to generate object signatures representing these objects, and thus distinguishes between the first and second objects in this first 2D frame based on differences between their object signatures. The application repeats this process over subsequent 2D frames and then links a new object detected in a later 2D frame to the first object detected in the first 2D frame based on similarities between their object signatures (e.g., based on minor "drift" between scores for all object classes in the predefined set of classes represented in object signatures for both the first and the new objects)— such as in addition to or instead of linking the first and new object based on 2D silhouette similarities or by overlapping trajectories—without necessitating that the object classifier be trained to distinguish many (e.g., thousands of) object genera and their many (e.g., millions) of species.

In one example, the application detects two objects in a first 2D frame and calculates object signatures for both objects, both of which include highest scores for a "human" object class but differing scores for other "secondary" object classes. The application repeats this process for subsequent 2D frames recorded by the camera and distinguishes and tracks these two unique humans across these subsequent 2D frames based on similarities and differences in "secondary" object classes in their object signatures.

The remote computer system can similarly leverage the object signature of an object to distinguish a unique object—represented in a 3D sparse map received from the mobile device—associated with an augmented reality asset from other unique objects not associated with augmented reality assets for the space currently occupied by the mobile device (and for a brand associated with the application, or for an experience hosted by the application, etc.) In one implementation, the remote computer system: extracts both a class or "genus" of an object (e.g., that the object is a cup) and a lower-level "species" of the object (e.g., that the object is a coffee cup branded with a logo of a particular coffee shop) from object scores contained in the object signature of the object; and then verifies a link between this object and an augmented reality asset associated with this space based on both the genus and the species of the object.

For example, the remote computer system can determine that an object is of a particular known object genus based on the object class associated with the highest score in the object signature. The remote computer system can also determine that the object is of a particular lower-level "species" (e.g., that the object is a coffee cup branded with a logo of a particular coffee shop) based on a similarity between: scores of multiple object classes in the object signature; and a preloaded definition of this species represented by a combination of specific scores or score ranges for these object classes. The remote computer system can then return an augmented reality asset to the mobile device if available for this species and genus of object in this space currently occupied by the mobile device.

The application can then implement similar methods and techniques to identify an object in a 2D frame and to verify whether an augmented reality asset received from the remote computer system corresponds to this object. In one example, when the mobile device is present at a coffee shop, the app: identifies a first coffee cup branded with a logo of the coffee shop in a sequence of 2D frames; projects augmented reality assets supplied by this coffee shop over the first coffee cup in this sequence of 2D frames; and renders these augmented frames on the display of the mobile device. However, when the application identifies a second water glass or a second cup branded with a different logo in this sequence of 2D frames, the application can: refrain from rendering this augmented reality asset over the second coffee cup in this sequence of 2D frames; or project a different augmented reality asset over the second coffee cup in this sequence of 2D frames.

6. Localization

Figure 4:
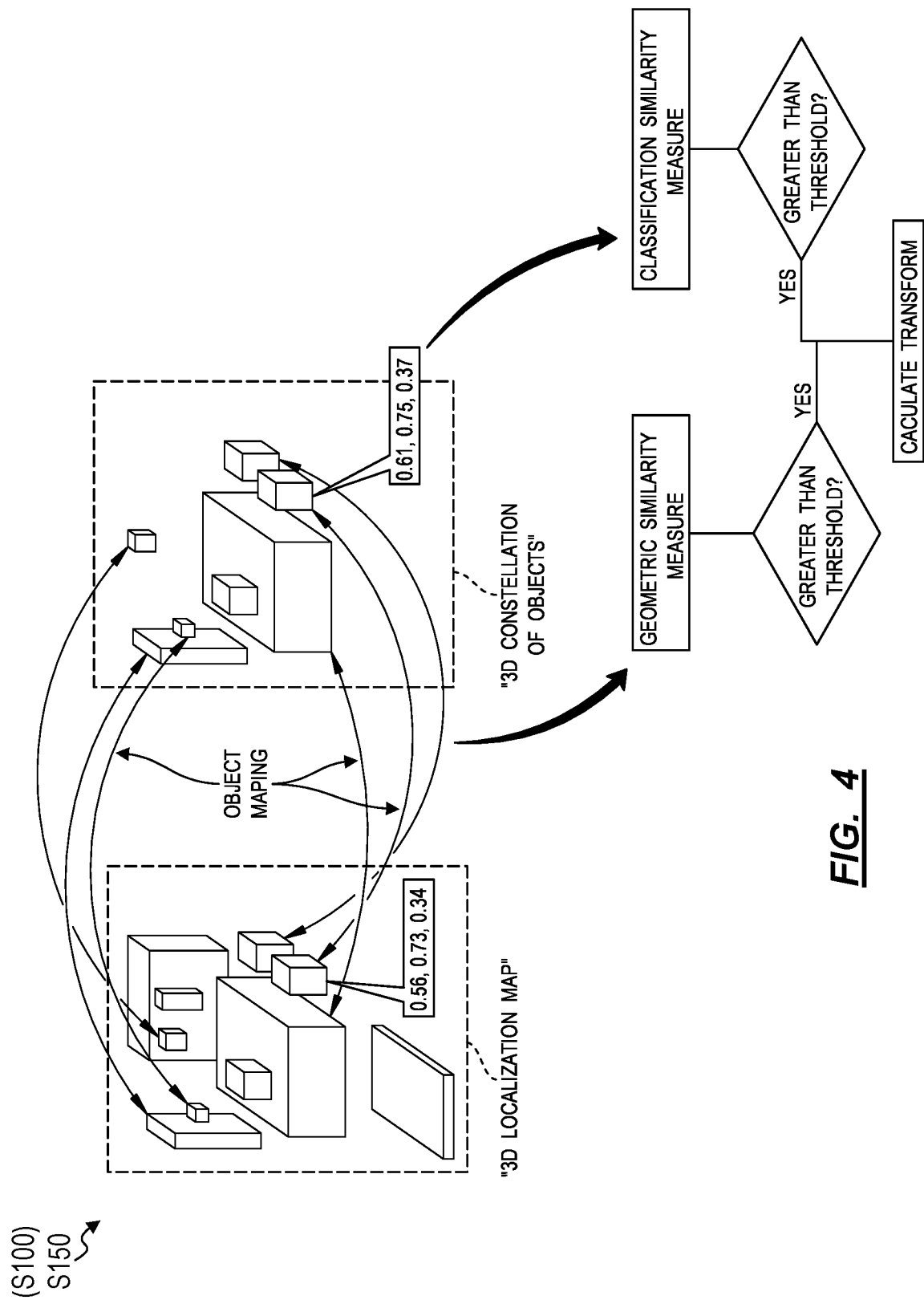
FIG. 4 is a flowchart representation of on variation of the method.

As shown in FIG. 1A and in FIG. 4, in Block S150, upon receipt of a 3D constellation of objects at a remote computer system, wherein the 3D constellation of objects can include the position of each object detected at the mobile device and the classification of each object, the remote computer system can compare the 3D constellation of objects to corpuses of 3D localization maps (or to one global 3D localization map) in order to quickly localize the mobile device without necessitating transfer of such a (large) 3D localization map to the mobile device and without necessitating additional, expensive computations to compare a 3D constellation of objects to this 3D localization map at the mobile device. In particular, the remote computer system can leverage a sparse, lightweight 3D map (e.g., the 3D constellation of objects) received from the mobile device in order to: quickly localize the mobile device and to access augmented reality assets assigned to static and/or dynamic objects proximal to the mobile device's location; enable the mobile device to allocate its computational power to detecting and classifying objects in the field of view of its camera, projecting augmented reality assets onto 2D frames recorded by the camera, and then rendering this augmented 2D frame on its display.

In one implementation, the remote computer system: receives, in Block S140, a timestamped, geotagged, 3D constellation of objects generated by the mobile device; reads a geotag from the 3D constellation of objects; and retrieves a 3D localization map of a space associated with a geospatial location nearest a geospatial location specified in the geotag. The remote computer system can then, in Block S150, calculate a particular position and orientation of the mobile device—relative to the virtual origin in the 3D localization map—that minimizes distances between: points representing objects of particular objects classes in the 3D constellation of objects; and locations of objects of the same classes depicted in the 3D localization map of the space. In particular, the 3D constellation of objects can depict 3D locations of objects in the field of view of the camera in the mobile device and relative to the camera over a brief (e.g., ~125-millisecond) period of time. The remote computer system can thus calculate a translation and a rotation in three dimensions that transforms the 3D constellation of objects (defined around a local virtual origin of the 3D constellation of objects) to a position and orientation in the space that minimizes distances between each object position in the 3D constellation of objects detected during the recording period at the mobile device; and a set of objects of like object classes (e.g., characterized by the same primary object class or similar object signatures) in the 3D localization map. The application can thus transform an approximate position and orientation of the mobile device relative to the local virtual origin (and, therefore, the 3D constellation of objects) to a location of the mobile device relative to the 3D localization map at the end of the recording period of the mobile device by applying the same transform to the nominal location of the mobile device. For example, the remote computer system can implement particle filter techniques to generate a set of particles representing possible positions and orientations of the camera around the location of the geotag during this brief period of time and to then test these particles for minimum distances between objects depicted in the 3D constellation of objects and objects of the same class depicted in the 3D localization map, such as in series or in parallel until a particle matching more than a threshold number of objects and with less than a threshold error between the 3D constellation of objects and the 3D localization map is identified.

In one implementation, the application can first calculate a maximum geometric similarity measure between the 3D constellation of objects and the 3D localization map (e.g., for each transformation tested by the app) by comparing the configuration of objects in 3D space in the 3D constellation of objects to the configuration of the objects in the 3D localization map (e.g., for example by calculating a Euclidian distance between objects in the 3D constellation of objects and the 3D localization map). In response to the application calculating a geometric similarity measure greater than a predetermined threshold geometric similarity measure, the application can then evaluate whether each object is classified in a similar manner to the nearest object in the 3D localization map by calculating a classification similarity measure (e.g., between a classification vector of an object in the 3D constellation of objects and a corresponding object in the 3D localization map). In response to calculating a classification similarity measure greater than a predetermined threshold classification similarity measure, the application can return the transformation for which these similarity measures were calculated.

More specifically, the application can: calculate a geometric similarity measure between the 3D constellation of objects and the 3D localization map. Subsequently, the application can, in response to the geometric similarity measure exceeding a geometric similarity threshold: identify a mapping of a set objects in the 3D constellation of objects to a corresponding set of objects in the 3D localization map; identify a classification similarity measure between classification vectors of the set of objects in the 3D constellation of objects and classification vectors of the corresponding set of objects in the 3D localization map based on the mapping; and, in response to the classification similarity measure exceeding a classification similarity threshold, calculate the transform aligning the 3D constellation of objects with the 3D localization map.

In this implementation, the remote computer system can also: filter the 3D constellation of objects to include objects tagged as static or immutable only and compare this filtered 3D constellation of objects to the 3D localization map to determine the position and orientation of the mobile device; or selectively match static or immutable objects represented in the 3D constellation of objects only to like static or immutable objects represented in the 3D localization map. Similarly, the remote computer system can filter the 3D constellation of objects to include objects tagged with object confidence scores that exceed a preset threshold. The remote computer system can additionally or alternatively weight objects in the 3D constellation of objects as a function of whether these objects are determined to be static.

Furthermore, in the variation described above in which the application incorporates a 3D bounding box for each object represented in the 3D constellation of objects, the remote computer system can compare the size of a bounding box representing a particular object depicted in the 3D constellation of objects to a size of a bounding box representing an object of a like class depicted in the 3D localization map in order: to inform initial comparison of the 3D constellation of objects and the 3D localization map; to verify correlation of objects of like object classes between the 3D constellation of objects and the 3D experience based on like object size; or to isolate a particular position and orientation of the mobile device from a set of possible positions and orientations derived from the object location/object class comparison described above.

The remote computer system can then return the location and orientation of the mobile device—such as relative to the virtual origin in the 3D localization map—to the mobile device. For example, the remote computer system can return to the mobile device a transform that represents a translation and rotation offset between the virtual origin in the 3D localization map and the real position and orientation of the mobile device at approximately the current time. The application—currently executing on the mobile device—can then project assembly media, defined for the space relative to the virtual origin, onto subsequent 2D frames in (near) real-time based on this transform. In particular, the application can merge augmented reality assets spatially referenced to a virtual origin and the transform to spatially locate the augmented reality assets on 2D frames recorded by the camera and rendered on the display of the mobile device in (near) real-time.

The remote computer system can repeat this process upon receipt of a next 3D constellation of objects from the mobile device, such as including prioritizing testing of possible positions and orientations of the mobile device near the last position and orientation calculated for the mobile device or prioritizing testing of objects detected or data generated near the current location of the mobile device.

The remote computer system can also implement a first process to rapidly achieve an initial location estimate of the mobile device. After deriving this initial location estimate of the mobile device, the remote computer system can execute a second process according to the foregoing methods and techniques to refine the calculated location and orientation of the mobile device. The remote computer system can therefore selectively implement a process tailored for speed to calculate an initial location estimate of the mobile device and then implement a process tailored for accuracy to refine the initial location of the mobile device estimate over time. Furthermore, to refine the initial location estimate of the mobile device, the remote computer system can: execute multiple processes simultaneously to refine the initial location estimate; then compare results of these processes according to a single metric (e.g., how well the detected objects and planes are aligned by a result) to determine which of these results is most likely to be most accurate; and then refine the location estimate according to this one result (or based on a weighted or non-linear combination of these results).

In one implementation, the application can calculate a transformation positionally matching a 3D constellation of objects (defined about a local virtual origin) to a 3D localization map defined about a global virtual origin. The application can then calculate a position of the mobile device relative to the global virtual origin by translating and/or rotating the last-calculated position of the mobile device relative to the local virtual origin by the transform. However, the last-calculated position of the mobile-device recorded during a first recording period may be out of date at the time when the application calculates the transform. In this case, the mobile device can record a second series of frames and a second set of motion data in order to update its location relative to the 3D constellation of objects. The application can then transform the newly calculated location (and/or orientation) of the mobile device relative to the 3D constellation of objects to a location (and/or orientation) of the mobile device relative to the 3D localization map. More specifically, the mobile device can, during a second recording period, succeeding reception of the transform at the mobile device: record a second series of frames; and record a second set of motion data. The mobile device can additionally calculate the position of the mobile device relative to the 3D localization map based on the transform, the second series of frames, and the second set of motion data.

Furthermore, the mobile device can continuously track its position using aforementioned inertial tracking and/or dead reckoning techniques. More specifically, the mobile device can calculate its position by: tracking a position of the mobile device relative to the first 3D constellation of objects based on the second set of frames and the second set of motion data; and, in response to receiving the transform from the remote computer system, transforming the position of the mobile device relative to the first 3D constellation of objects to the position of the mobile device relative to the 3D localization map based on the transform.

In one implementation, the mobile device can: detect a second 3D constellation of objects; classify these objects; and align these objects with the localization map in order to calculate an updated position. In this implementation, upon losing sight of the previous 3D constellation of objects, the mobile device can record a second series of frames and a second set of motion data in order to detect a second 3D constellation of objects. The application can utilize the relative positions of shared objects between the first 3D constellation of objects and the second 3D constellation of objects to obtain an initial (rough) estimate of the position of the mobile device relative to the 3D localization map. Alternatively, the application can perform the above-described localization techniques to calculate the position of the mobile device relative to the 3D localization map. More specifically the application can: detect relative positions of a second 3D constellation of objects based on the second series of frames and the second set of motion data; generate classifications of the second 3D constellation of objects by calculating a classification of each object in the second 3D constellation of objects based on the second series of frames; and calculate the position of the mobile device by matching the second 3D constellation of objects to a subset of objects in the 3D localization map.

7. Augmented Reality Content Creation

In one implementation, the remote computer system can interface with a content creation app executed at a content creation device, which can populate a 3D localization map including objects in an area of interest (e.g., that has been mapped by an operator using the operator application). More specifically, the content creation app can, at a content creation device: render a representation of the 3D localization map; render a content creation interface; and receive input at the content creation interface representing locations of augmented reality assets in the 3D localization map. In response to the input at the content creation interface, the application can then create the augmented reality assets in the 3D localization map according to the input at the content creation interface.

However, the application can generate augmented reality assets in any other way.

8. Augmented Reality Assets

As shown in FIGS. 2 and 3, if the remote computer system returns an augmented reality asset linked to an asset detected by the application in a current or last frame recorded by the camera, the application can then verify that rules for rendering this augmented reality asset are met and then project this augmented reality asset into the viewfinder on the mobile device accordingly in Block S160.

In one implementation, the remote computer system returns augmented reality assets for the space occupied by the mobile device to the mobile device. For example, the remote computer system can return to the mobile device augmented reality assets linked to fixed or immutable objects in the space (e.g., walls, tables, fixed art installations, trees) near (i.e. proximal to) the location of the mobile device and/or within or near the field of view of the camera in the mobile device predicted by the remote computer system based on the mobile device's location and/or orientation; the application can then cache these augmented reality assets and selectively overlay them over or adjacent corresponding static or immutable objects detected by the application in 2D frames subsequently recorded by the camera. The remote computer system can also return to the mobile device: augmented reality assets linked to dynamic and immutable (or "mobile") objects represented directly in the current 3D constellation of objects received from the mobile device; and/or augmented reality assets linked to dynamic or immutable objects predicted to occupy the space with the mobile device, regardless of whether the application has yet detected these objects.

Additionally, the remote computer system can return and the mobile device can render other types of augmented reality assets upon localization of the mobile device relative to a 3D localization map. Thus, augmented reality assets can include data pertaining to the location of the user but not tied to a particular location itself. For example, if the mobile device is located within a particular room in a store, the remote computer system can return and the mobile device can render a list of products available in the room of the store, without this list appearing as in augmented reality as an object (e.g., the application can render the list in an adjacent interface). Additionally, augmented reality assets can include data pertaining to the location of other mobile devices relative to the 3D localization map. For example, the remote computer system can return and the mobile device can render the location of other mobile devices relative to the mobile device and indicate the distance between the mobile device an another mobile device in the application executing on the mobile device.

Therefore, in one implementation, the application can: calculate a position of the mobile device relative to the 3D localization map and an orientation of the mobile device relative to the 3D localization map; and identify a subset of augmented reality assets in the set of augmented reality assets within a field of view of the mobile device based on the position of the mobile device relative to the 3D localization map and the orientation of the mobile device relative to the 3D localization map; and render the subset of augmented reality assets onto a display based on positions of the subset of augmented reality assets in the 3D localization map and based on the position of the mobile device relative to the 3D localization map and the orientation of the mobile device relative to the 3D localization map.

In one implementation, the application can initiate download and caching of augmented reality assets before localization of the mobile device is completed at the remote computer system. For example, the mobile device can detect its geolocation or other rough positional estimate and the application can compare this geolocation to geolocations of known 3D localization maps and identify augmented reality assets proximal to the estimated position of the mobile device. Therefore, the application can concurrently begin caching and synchronizing augmented reality assets and localizing the mobile device. More specifically, the application can: estimate an approximate position of the mobile device relative to the 3D localization map; and identify the set of augmented reality assets defined in the 3D localization map proximal to the approximate position.

The mobile device then: caches these augmented reality assets received from the remote computer system; selectively projects (e.g., "overlays") these assets on 2D frames recorded by the camera based on signatures of objects detected in the frames, whether these objects are immutable or mutable, rules for rendering these augmented reality assets, and the transform representing the position and orientation of the mobile device at approximately this time; and then renders these 2D frames with augmented content on the display of the mobile device. For example, each augmented reality asset can be spatially referenced to the virtual origin defined in the 3D localization map. Upon receipt of a next 2D frame reordered by the camera, the application can: implement methods and techniques described above to identify an object linked to a particular augmented reality asset stored in the cache; calculate a 3D position of the object relative to the mobile device (e.g., relative to the optical axis and optical sensor of the camera); match the particular object to a particular augmented reality asset stored in the cache; and then verify that the particular object fulfills rules designated for this particular augmented reality asset. If so, the application can then: combine the position of the particular object relative to the mobile device with the last transform received from the remote computer system and representing a last calculated position and orientation of the mobile device relative to the virtual origin to derive an object transform representing the position and orientation of the particular object relative to the virtual origin; and project the particular augmented reality asset onto the current 2D frame based on the object transform.

Furthermore, for a dynamic and mutable object detected in this 2D frame and associated with an augmented reality asset, the application can project this augmented reality asset onto this 2D frame based on the position of this object relative to the camera calculated by the application. The application can repeat these processes for other immutable and mutable objects detected in this 2D frame before rendering this augmented 2D frame on the mobile device's display substantially in real-time.

In one implementation, the application can generate an occlusion mask for the mobile device for use in rendering augmented reality assets that may be partially obscured by other objects in the scene. For example, in implementations that include a composite 3D map (i.e. a 3D point cloud map in addition to the set of objects in the 3D localization map), the application can calculate the field of view of the mobile device in the composite 3D map (e.g., based on camera characteristics of the mobile device and the position and orientation of the mobile device relative to the composite 3D map). The application can then identify surfaces and/or objects obscuring an augmented reality asset and, from the perspective of the mobile device, generate an occlusion mask representing regions of the field of view of the mobile device occupied by objects or surfaces that occlude the augmented reality asset. More specifically, the application can: calculate a field of view of the mobile device in the composite 3D map based on the position of the mobile device relative to the 3D localization map; identify an augmented reality asset in the set of augmented reality assets within the field of view of the mobile device in the composite 3D map; generate an occlusion mask for the augmented reality asset based on the field of view of the mobile device in the composite 3D map; and render the augmented reality asset obscured by the occlusion map onto the display of the mobile device.

In one implementation, the mobile device can render augmented reality assets as an overlay over a real object in the area of interest. For example, the mobile device can augment the color, surface texture, or any other superficial feature of existing objects in the area of interest. In rendering an overlay object, the mobile device can utilize an object specific model to identify the location of features of the object in order to locate an augmented reality overlay on the screen of the device such that the augmented reality overlay aligns with the real object in the area of interest. More specifically, the application can, during a second recording period succeeding the first recording period: record a second series of frames; and record a second set of motion data. The application can then: detect an augmented object within the field of view of the mobile device based on the second series of frames; calculate a position of the augmented object based on the second series of frames and the second set of motion data; calculate a signature of the augmented object based on the second series of frames and the second set of motion data; and, in response to matching the signature of the augmented object to a signature of an object represented in the 3D localization map corresponding to an overlay in the set of augmented reality assets based on the position of the augmented object, render an overlay on the augmented object on the display.

As described above, the application can continue to access 2D frames recorded by the camera, transform these 2D frames into 3D constellation of objects, and return these 3D constellation of objects to the remote computer system; and the remote computer system can continue to localize the mobile device based on the 3D constellation of objects, return the location of the mobile device to the mobile device (e.g., in the form of a transform between the virtual origin and the calculated position and orientation of the mobile device), and return augmented reality assets and related rules to the mobile device as the mobile device nears or enters positions and orientations associated with these augmented reality assets. Upon receipt of additional augmented reality assets and locations of the mobile device, the application can store these additional augmented reality assets in the cache and selectively project augmented reality assets from the cache onto subsequent 2D frames recorded by the camera. Therefore, at the mobile device and during a second recording period succeeding the first recording period, the application can: record a second series of frames; and record a second set of motion data. The application can then: calculate a position and orientation of the mobile device relative to the 3D localization map based on the second series of frames and the second set of motion data; project a field of view of the mobile device in the 3D localization map based on the position and orientation of the mobile device relative to the 3D localization map; identify an augmented reality asset in the set of augmented reality assets within the field of view of the mobile device; and render the augmented reality asset on the display of the mobile device based on the position of the augmented reality asset relative to the 3D localization map and the position and orientation of the mobile device relative to the 3D localization map.

9. Variations

In one variation, rather than return a transform or other representation of the mobile device's location relative to a virtual origin defined in the 3D localization map, the remote computer system can instead calculate a geospatial location and orientation of the mobile device and return these geospatial values to the mobile device. The remote computer system can also locate augmented reality assets within a geospatial coordinate system rather than relative to the virtual origin.

In another variation, the application can implement methods and techniques similar to those described above: to detect surfaces, such as walls, floors, ceilings, table tops; to calculate surface signatures for these surfaces; and to represent these surfaces within a 3D constellation of objects. The remote computer system can then implement methods and techniques similar to those described above to localize the mobile device based on surfaces represented in a 3D constellation of objects and like surfaces represented in the 3D localization map.

In yet another variation, the application can implement methods and techniques similar to those described above to generate 2D or 3D augmented reality overlay frames containing augmented reality assets only and then render these overlay frames on an augmented reality headset (e.g., augmented reality glasses) worn by a user, thereby rendering these augmented reality assets within the user's vision and substantially aligned to corresponding objects in the field around the user. For example, upon receipt of a next 2D frame reordered by the camera, the application can: implement methods and techniques described above to identify an object linked to a particular augmented reality asset stored in the cache; calculate a 3D position of the object relative to the mobile device (e.g., relative to the optical axis and optical sensor of the camera); match the particular object to a particular augmented reality asset stored in the cache; and then verify that the particular object fulfills rules designated for this particular augmented reality asset. If so, the application can then: combine the position of the particular object relative to the mobile device with the last transform received from the remote computer system and representing a last calculated position and orientation of the mobile device relative to the virtual origin to derive an object transform representing the position and orientation of the particular object relative to the virtual origin; and project the particular augmented reality asset onto an empty 2D image based on the object transform. The application can repeat this process for other objects detected in the 2D frame before rendering this 2D image on the mobile device's display substantially in real-time.

In another variation, once the location confidence score and the object confidence score for a static or immutable object—detected by app and received by the remote computer system—exceed corresponding threshold scores, the remote computer system can inject location and object signature data for this object into the 3D localization map in order to extend the 3D localization map with representations of additional objects and/or to supplement existing representations of objects in the 3D localization map with additional data. Similarly, as the remote computer system collects data from mobile devices moving through locations associated with discrete 3D localization maps and extends these 3D localization maps, the remote computer system can stitch this 3D localization maps together to generate a larger, more comprehensive "global" localization map.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:
   at a device, during a time period:
      capturing a set of frames; and
      capturing a set of motion data representing motion of the device;
   detecting a first set of relative positions of a constellation of objects based on the set of frames and the set of motion data;
   generating a first set of classification vectors of the constellation of objects, each classification vector in the first set of classification vectors containing a set of confidence scores representing similarities between an object, in the constellation of objects, and an object class in a set of object classes; and
   calculating a transform that aligns the constellation of objects to a set of objects represented in a localization map, the set of objects characterized by:
      a second set of relative positions analogous to the first set of relative positions of the constellation of objects; and
      a second set of classification vectors analogous to the first set of classification vectors of the constellation of objects.

2. The method of claim 1, further comprising:
   returning, to the device, a set of augmented reality assets defined by the localization map and the transform; and
   at the device, rendering the set of augmented reality assets based on positions of the set of augmented reality assets in the localization map and based on the transform.

3. The method of claim 1, wherein detecting the first set of relative positions of the constellation of objects comprises, for each object in the constellation of objects:
   for each frame in a subset of the set of frames:
      detecting the object in the frame; and
      generating a set of points representing estimated distances from a camera of the device to surfaces on the first object;
   compiling the set of points into a cluster of points based on the set of motion data; and
   calculating a relative position of the object relative to the local virtual origin based on the cluster of points.

4. The method of claim 1, wherein generating the first set of classification vectors comprises, for each object in the constellation of objects and for each object class in a set of object classes, calculating a confidence score in the classification vector based on an object classification model and the set of frames, the confidence score representing likeness of the object to the object class.

5. The method of claim 1, wherein calculating the transform comprises:

calculating a geometric similarity measure between the constellation of objects and the localization map; and
in response to the geometric similarity measure exceeding a geometric similarity threshold:
identifying a mapping of a set objects in the constellation of objects to a corresponding set of objects in the localization map;
calculating a classification similarity measure between the first set of classification vectors of the constellation of objects and the second set of classification vectors of the set of objects in the localization map based on the mapping; and
in response to the classification similarity measure exceeding a classification similarity threshold, calculating the transform aligning the constellation of objects with the localization map.

6. A method comprising:
at a device, during a first time period:
capturing a first set of frames; and
capturing a first set of motion data representing motion of the device;
detecting a first set of relative positions of a first constellation of objects based on the first set of frames and the first set of motion data;
calculating a first set of classification vectors of objects in the first constellation of objects based on the first set of frames;
calculating a transform that aligns the first constellation of objects with a set of objects defined in a localization map, the set of objects characterized by:
a second set of relative positions analogous to the first set of relative positions of the first constellation of objects; and
a second set of classification vectors analogous to the first set of classification vectors of the first constellation of objects;
returning, to the device:
a set of augmented reality assets defined by the localization map; and
the transform; and
at the device:
calculating a position of the device relative to the localization map based on the transform; and
rendering the set of augmented reality assets based on positions of the set of augmented reality assets in the localization map and based on the position of the device in the localization map.

7. The method of claim 6:
further comprising, at the device during a second time period, succeeding reception of the transform at the device:
capturing a second set of frames; and
capturing a second set of motion data; and
wherein calculating the position of the device relative to the localization map comprises calculating the position of the device relative to the localization map based on the transform, the second set of frames, and the second set of motion data.

8. The method of claim 7, wherein calculating the position of the device comprises:
tracking a position of the device relative to the first constellation of objects based on the second set of frames and the second set of motion data; and
in response to receiving the transform, transforming the position of the device relative to the first constellation of objects to the position of the device relative to the localization map based on the transform.

9. The method of claim 7 relative to the localization map based on the transform, the second set of frames, and the second set of motion data furtheThe method of claim 7, wherein calculating the position of the device comprises:
detecting a third set of relative positions of a second constellation of objects based on the second set of frames and the second set of motion data;
generating a third set of classification vectors of the second constellation of objects by calculating a classification vector of each object in the second constellation of objects based on the second set of frames; and
calculating the position of the device by matching the second constellation of objects to the set of objects in the localization map.

10. The method of claim 6:
wherein calculating the position of the device comprises calculating the position of the device relative to the localization map and an orientation of the device relative to the localization map; and
wherein rendering the set of augmented reality assets comprises:
identifying a subset of augmented reality assets in the set of augmented reality assets within a field of view of the device based on the position of the device relative to the localization map and the orientation of the device relative to the localization map; and
rendering the subset of augmented reality assets based on positions of the subset of augmented reality assets in the localization map and based on the position of the device relative to the localization map and the orientation of the device relative to the localization map.

11. The method of claim 6, wherein returning the set of augmented reality assets defined by the localization map further comprises:
estimating an approximate position of the device relative to the localization map; and
identifying the set of augmented reality assets defined in the localization map within a threshold distance of the approximate position.

12. The method of claim 6, further comprising:
at a mapping device:
capturing a second set of frames capturing an area of interest; and
capturing a second set of motion data representing motion of the mapping device;
identifying the set of objects based on the second set of frames and the second set of motion data;
for each object in the set of objects:
calculating a relative position of the object in the second set of relative positions, the relative position of the object relative to a virtual origin; and
calculating a classification vector in the second set of classification vectors of the object; and
generating the localization map based on the second set of relative positions and the second set of classification vectors of each object in the set of objects.

13. The method of claim 12, further comprising:
generating a sparse set of points representing distances from a camera of the mapping device to surfaces of the area of interest based on the second set of frames and the second set of motion data;
generating a sparse point cloud reconstruction of the area of interest based on the sparse set of points; and
at the mapping device, rendering the sparse point cloud reconstruction of the area of interest.

14. The method of claim 13, further comprising:
generating a dense set of points representing distances from the camera of the mapping device to surfaces of the area of interest based on the second set of frames and the second set of motion data;
generating a dense point cloud reconstruction of the area of interest based on the dense set of points; and
overlaying the dense point cloud reconstruction over the localization map to generate a composite map.

15. The method of claim 14, wherein rendering the set of augmented reality assets comprises, at the device:
calculating a field of view of the device in the composite map based on the position of the device relative to the localization map;
identifying an augmented reality asset in the set of augmented reality assets within the field of view of the device in the composite map;
generating an occlusion mask for the augmented reality asset based on the field of view of the device in the composite map; and
rendering the augmented reality asset obscured by the occlusion map.

16. The method of claim 12, further comprising:
at a content creation device:
rendering a representation of the localization map;
rendering a content creation interface; and
receiving input at the content creation interface representing locations of augmented reality assets in the localization map; and
creating the augmented reality assets in the localization map according to the input at the content creation interface.

17. A method comprising:
at a device, during a first time period:
capturing a first set of frames; and
capturing a first set of motion data representing motion of the device;
detecting a first set of relative positions of a constellation of objects based on the first set of frames and the first set of motion data;
generating a first set of object signatures of the constellation of objects, each object signature in the first set of object signatures containing a set of confidence scores representing similarities between an object, in the constellation of objects, and an object class in a set of object classes;
calculating a transform that aligns the constellation of objects with a set of objects represented in a localization map, the set of objects characterized by:
a second set of relative positions analogous to the first set of relative positions of the constellation of objects; and
a second set of object signatures analogous to the first set of object signatures of the constellation of objects;
accessing a set of augmented reality assets represented in the localization map;
calculating a position of the device relative to the localization map based on the transform and the first set of motion data; and
rendering the set of augmented reality assets based on positions of the set of augmented reality assets in the localization map and based on the position of the device in the localization map.

18. The method of claim 17, wherein rendering the set of augmented reality assets comprises:
at the device, during a second time period succeeding the first time period:
capturing a second set of frames; and
capturing a second set of motion data;
calculating a position and orientation of the device relative to the localization map based on the second set of frames and the second set of motion data;
projecting a field of view of the device in the localization map based on the position and orientation of the device relative to the localization map;
identifying an augmented reality asset in the set of augmented reality assets within the field of view of the device; and
rendering the augmented reality asset based on the position of the augmented reality asset relative to the localization map and the position and orientation of the device relative to the localization map.

19. The method of claim 17:
wherein detecting the first set of relative positions of the constellation of objects further comprises, detecting positions of the constellation of objects relative to a local virtual origin based on the set of frames and the set of motion data;
wherein calculating the transform aligning the constellation of objects with a localization map further comprises calculating the transform aligning the local virtual origin with a global virtual origin of the localization map; and
wherein calculating the position of the device relative to the localization map further comprises calculating the position of the device relative to the global virtual origin of the localization map.

20. The method claim 17, wherein detecting the first set of relative positions of the constellation of objects comprises detecting the relative position of a planar surface, the planar object comprising a distinct 2D pattern.

* * * * *

UNITED STATES PATENT AND TRADEMARK OFFICE
CERTIFICATE OF CORRECTION

PATENT NO. : 11,776,222 B2  
APPLICATION NO. : 17/555925  
DATED : October 3, 2023  
INVENTOR(S) : Stauber et al.

Page 1 of 1

It is certified that error appears in the above-identified patent and that said Letters Patent is hereby corrected as shown below:

In the Claims

In Column 26, Lines 1-3, please delete "The method of claim 7 relative to the localization map based on the transform, the second set of frames, and the second set of motion data furthe"

Signed and Sealed this  
Thirtieth Day of September, 2025

John A. Squires  
*Director of the United States Patent and Trademark Office*